United States Patent
Wakayama et al.

(10) Patent No.: US 6,929,672 B1
(45) Date of Patent: Aug. 16, 2005

(54) FILTER MEDIUM FOR AIR FILTER AND PROCESS FOR PRODUCING THE SAME

(75) Inventors: Yoshihide Wakayama, Chigasaki (JP); Sadao Kobayashi, Yokohama (JP); Satoki Sugiyama, Sendai (JP); Seiichi Takizawa, Sagamihara (JP); Takeshi Yamada, Machida (JP); Keiji Matsuno, Fuchu (JP)

(73) Assignees: Taisei Corporation (JP); Kondoh Industries, Ltd. (JP); Cambridge Filter Japan, Ltd. (JP)

( * ) Notice: Subject to any disclaimer, the term of this patent is extended or adjusted under 35 U.S.C. 154(b) by 0 days.

(21) Appl. No.: 09/601,390
(22) PCT Filed: Dec. 22, 1998
(86) PCT No.: PCT/JP98/05807
§ 371 (c)(1), (2), (4) Date: Jul. 31, 2000
(87) PCT Pub. No.: WO00/37160
PCT Pub. Date: Jun. 29, 2000

(51) Int. Cl.[7] .............................................. B01D 39/04
(52) U.S. Cl. ...................... 55/385.2; 55/524; 55/DIG. 5
(58) Field of Search ................................ 55/385.2, 524, 55/528, 511, 502, DIG. 5

(56) References Cited

U.S. PATENT DOCUMENTS 3,944,690 A * 3/1976 Distler et al. ............... 427/389
4,291,087 A * 9/1981 Warburton, Jr. ............. 427/375
4,859,527 A * 8/1989 DiStefano .................... 428/288
5,514,196 A * 5/1996 Tanahashi et al. ............ 55/324

FOREIGN PATENT DOCUMENTS

| JP | 06142439 A | 5/1994 | .................... 53/34 |
| JP | A-9-29020 | 2/1997 | |
| JP | A97/187612 | 7/1997 | |
| WO | WO97/04851 A | 2/1997 | |

* cited by examiner

Primary Examiner—Robert A. Hopkins
(74) Attorney, Agent, or Firm—Young & Basile, P.C.

(57) ABSTRACT

The present invention has as its object to provide an air filter not only for trapping suspended particulate substances but also for not generating hazardous contaminates in the air, which cause trouble in the manufacture of semiconductor devices. As a binder to bind fibers of the air filter together, a polymer dispersion is used in which a copolymer of a hydrophilic monomer and a hydrophobic monomer is dispersed in water. As an initiator for polymerization of the copolymer, an organic peroxide is used. When an air filter (8) is installed downstream of a chemical filter (7), the space (4) placed downstream of the air filter (8) is made substantially free of organic substances and/or inorganic substances that cause trouble in the manufacture of semiconductor devices.

8 Claims, 4 Drawing Sheets

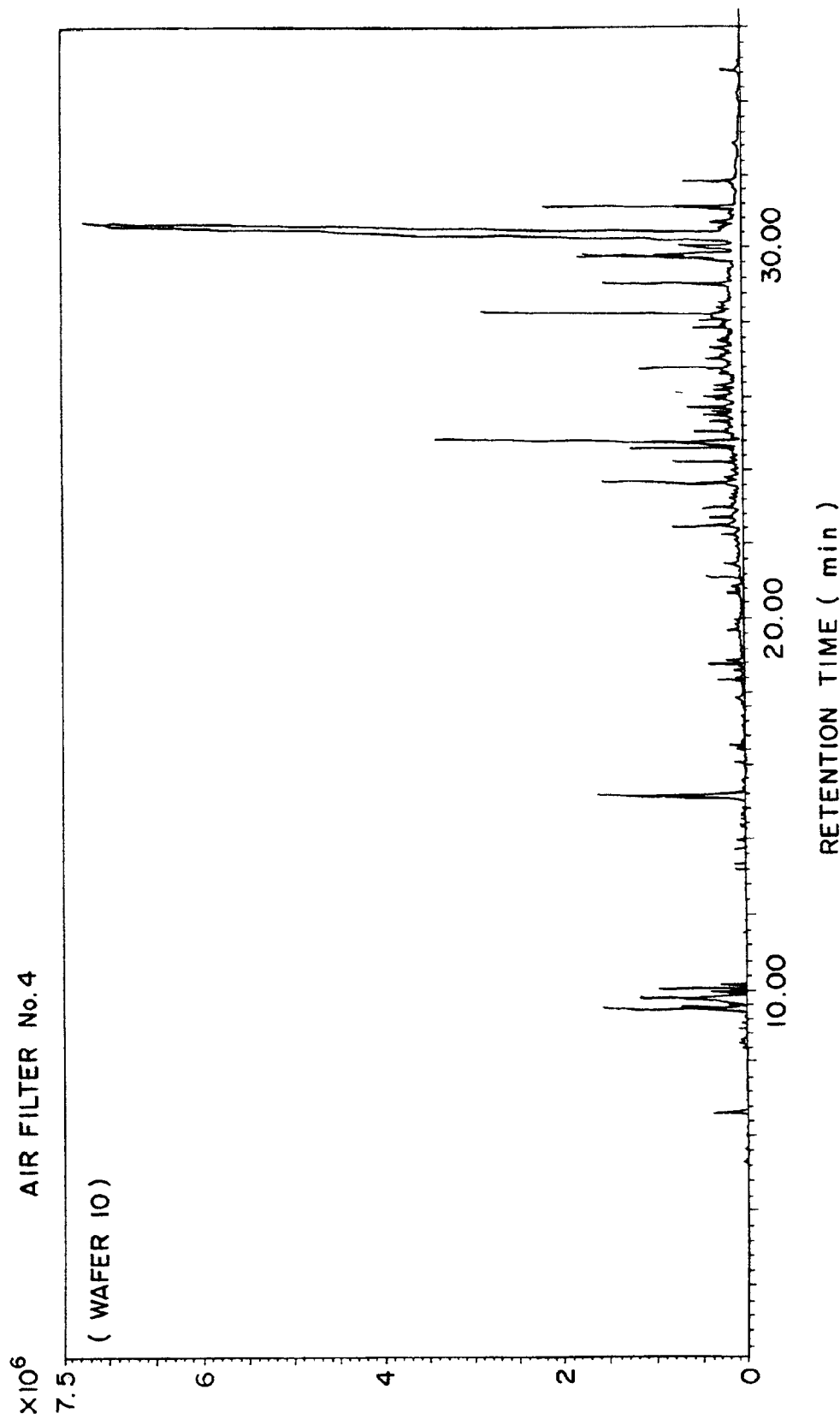

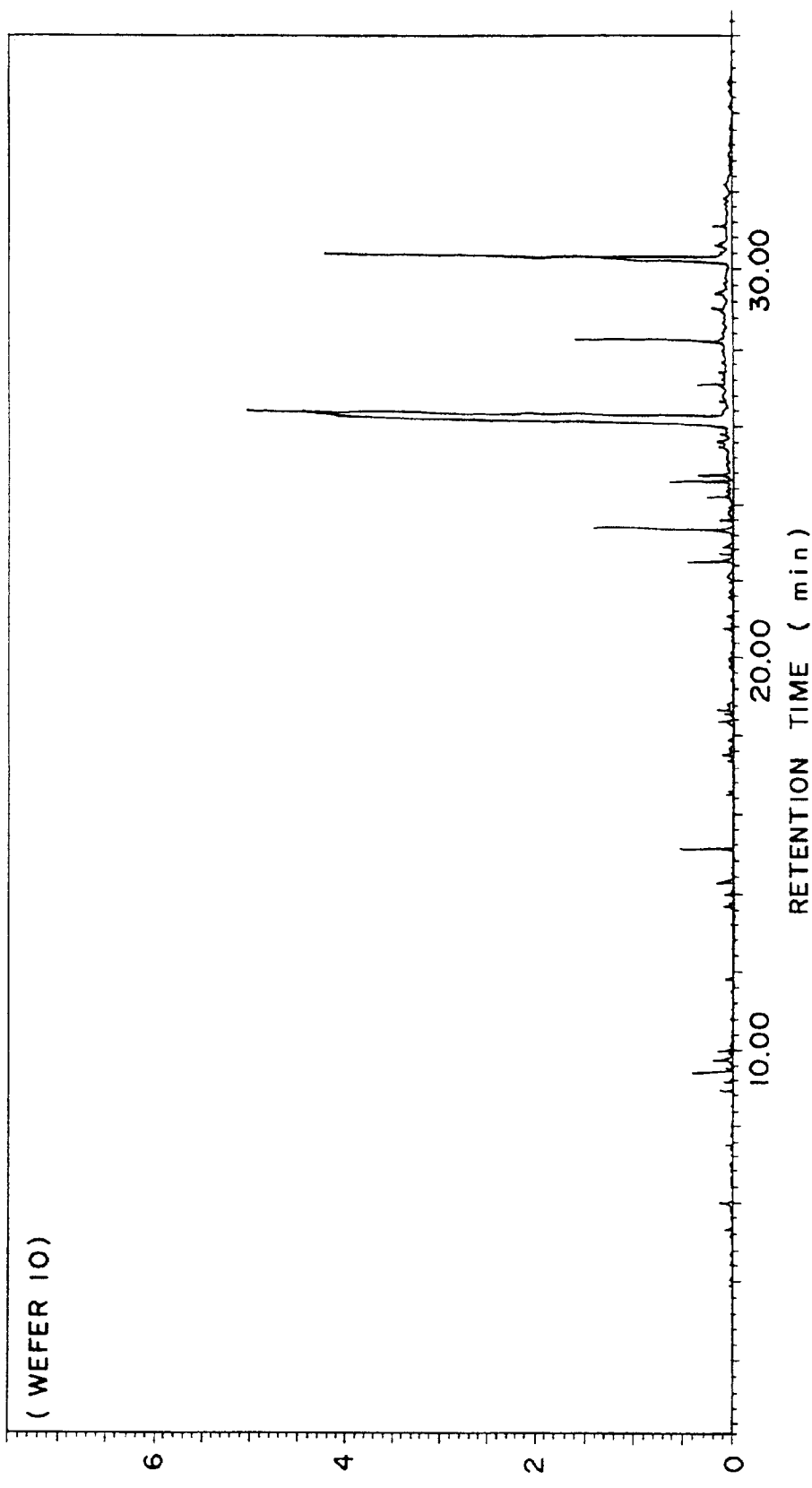

FILTER MEDIUM FOR AIR FILTER AND PROCESS FOR PRODUCING THE SAME

TECHNICAL FIELD

Air filters for trapping suspended particulate substances in the air are installed in clean rooms or local clean equipment, such as clean benches and clean booths, to be used in industries of semiconductors, food, pharmaceuticals, and biotechnology, among others. The present invention relates to a filter medium, and more particularly to a filter medium that has a special feature in its binder.

BACKGROUND ART

Generally, air filters that, use fibers as the filter medium have been used widely in conventional clean rooms. Above all else, the air filters that use glass fiber as the filter medium, such as ULPA (Ultra Low Penetration Air) filters and HEPA (High Efficiency Particle Air) filters are superior in that they can remove ultra-fine particles. For example, the ULPA filter can remove ultra-fine particles with diameters of 0.1 $\mu$m or larger.

With progressive increase in integration degree of semiconductor devices in recent years, with respect to the air contamination in clean rooms, problems not only of airborne dust but also of gaseous organic substances have come to draw attention (Fujii: "Present State of Affairs of Gaseous Contaminants and Measures for their Removal, Air Cleaning" Vol. 32, No. 3, P. 43, 1994 ).

It has been well known that the organic adsorbates on silicon wafer adsorbed from the air in the conventional clean room which contain many kinds of gaseous organic substances, would degrade the performance of semiconductor devices manufactured using the said silicon wafer. The deterioration of the semiconductor devices would be caused by a decrease in reliability of the gate oxide film (Shimazaki et al.: Proceedings of 1992 Spring Meeting of The Japan Society of Applied Physics p.686)

According to the research by the present inventors, conventional air filters generate gaseous organic substances, such as cyclosiloxanes, organic carboxylic acid esters, organic phosphoric acid esters, hydrocarbons, and phenols (Kobayashi et al.: Proceedings of the $42^{nd}$ Japan Society of Applied Physics and Related Societies, No. 1, p.356, 1995). The inventors have clarified that those organic substances are generated from treatment agents used to treat fiber in the manufacture of filter medium for the air filters and the organic substances are generated also from the sealing materials for adhering the filter medium and its support frame.

The present inventors have found that a method to heat the air filter in a hot gas stream is effective to reduce the generation of organic substances from the air filter, and have filed a patent application for this method (Refer to JP-A-9-29020). The present inventors have filed a patent application for an air filter that uses a water repellent, a plasticizer, and an antioxidant that generate less organic substances as the above noted treating agent (Refer to International Publication No. WO97/04851.)

It has been well known that a a-type semiconductor can be obtained by doping of P(phosphorus) into a silicon wafer and a p-type semiconductor can be obtained by doping with B (boron) in the semiconductor device manufacturing process. If air borne phosphorus compounds or boron compounds are present in a clean room, there is a possibility that unnecessary doping occurs, so that it is required to remove those contaminants from the air of the clean room. Filter medium and sealing materials, which use fiber not containing those inorganic compounds, are also disclosed in WO97/04851.

Inorganic contaminants that give rise to problems in the manufacture of semiconductor devices include P (phosphorus) and B (boron), which have been mentioned above, and also include ammonium ion ($NR_4^+$), nitric acid ion ($NO_3^-$), sulphuric acid ion ($SO_4^{2-}$) chlorine ion ($Cl^-$) and so on. For example, chlorine ion or sulphuric acid ion contaminate semiconductors and reduces production yields. Ammonium ion and sulphuric ion fog up lenses that focus ultraviolet rays used as the light source in the lithographic process.

Nonetheless, in the prior art mentioned above, no study has been made of an air filter that does not generate such hazardous inorganic substances. The above-mentioned prior art has room for further improvement with respect to the reduction in organic substances that are generated in the manufacture of semiconductor devices.

The present invention has been invented with the problems of the prior art taken into consideration and has as its object to provide an air filter for trapping suspended particulate substances in the air, wherein the air filter provides better effects of suppressing the release of organic and inorganic substances that cause the trouble mentioned above than the prior-art air filter.

DISCLOSURE OF THE INVENTION

After repeated studies to solve the above problems, the present inventors have found out that the binder, which used binds fibers to form filter medium for air filters, was the largest source for generation of organic and inorganic substances that cause trouble in the manufacture of semiconductor devices.

From the above finding, the present invention provides a filter medium for an air filter formed as unwoven sheet in which fibers are bound by a binder, wherein the binder has as its main ingredient a polymer dispersion in which a copolymer of a hydrophilic monomer and a hydrophobic monomer are dispersed in water.

In the conventional ULPA filter, acrylic emulsion is used for the binder to form a filter medium. An acrylic emulsion is obtained by adding a hydrophobic monomer, such as methyl methacrylate or methyl acrylate, to water in which emulsifier was dissolved, and causing polymerization (emulsion polymerization) to occur by using water-soluble polymerization initiator under stirring. An anionic and/or nonionic surface active agent are used as the emulsifiers. Ammonium persulfate, potassium persulfate or the like is used for the polymerisation initiator. Other additives are alcohols, esters, ethers or the like. Consequently, the binder for the conventional filter medium includes organic and inorganic substances that cause the above mentioned trouble in the manufacture of semiconductor devices.

In contrast, the binder for forming filter medium, used in the present invention has as its principal constituent a polymer dispersion having a copolymer made of a hydrophilic monomer (a monomer with hydrophilic groups) and a hydrophobic monomer (a monomer with hydrophobic groups) dispersed in water. Since the copolymer includes hydrophilic groups, the polymer dispersion has the copolymer dispersed stably in water without using additives, such as an emulsifier.

For this reason, the binder for forming a filter medium, used in the present invention, does not contain any organic substances of low molecular weight that result from an emulsifier or other additives, or if it contains, the content of organic substances is very small. Consequently, according to a filter medium for an air filter in the present invention, the generated amount of organic substances that are problematic in the manufacture of semiconductor devices can be made smaller than in the conventional filter medium for air filters.

More specifically, according to a filter medium for an air filter, when a binder content in the filter medium is set at three to seven wt % for example, the generated amount of organic substances can be reduced to 50 $\mu$g or less for 1.0 g of filter medium (this value was measured by an analytical method to be described referring to embodiments off the present invention). In contrast, under the same condition, the conventional filter medium for an air filter generates 200 $\mu$g or more of organic substances for 1.0 g of filter medium.

It ought to be noted that in the filter medium for an air filter according to the present invention, it is possible to use a binder formed by adding a polymer emulsion, made by using an emulsifier by a conventional method, to the above-mentioned polymer dispersion. The added amount of polymer emulsion in this case is preferably 50 wt % or less of the above-mentioned polymer dispersion. The content of volatile organic substances in the polymers (polymers constituting the polymer emulsion and polymers constituting the polymer dispersion) contained in the binder is preferably 500 $\mu$g or less per gram of the solid content of polymers.

As the hydrophilic monomer usable in the present invention, at least one can be cited that is selected from acrylic acid, methacrylate and methallyl sulfonate. As the hydrophobic monomer usable in the present invention, at least one can be cited that is selected from ethylene, propylene, acrylic ester, methacrylate eater, and styrene. A copolymer can be obtained by combining the hydrophilic and hydrophobic monomers, a polymer dispersion is obtained by dispersing the obtained copolymer in water. By using a binder chiefly consisting of this polymer dispersion, fibers are bound together. A filter medium obtained in this manner can satisfy a designated specification for pressure loss and tensile strength.

Mixing ratios of a hydrophilic monomer to a hydrophobic monomer used for the manufacture of a copolymer as a constituent of the binder vary with the concentration of the copolymer in the polymer dispersion, but, for example, the hydrophilic monomer content to a total amount of hydrophilic and hydrophobic monomers is set from 2% up to 20%. If the hydrophilic monomer content is too high, the copolymer swells by absorbing water and becomes sticky, a property unsuitable for a binder for forming a filter medium. If the hydrophilic monomer content is too low, the copolymer decreases in its affinity for water, and reduces the stability in producing a uniform polymer dispersion.

When the hydrophilic monomer content is made lower than the hydrophobic monomer content ,the copolymer that constitutes a binder contains more hydrophobic groups than hydrophilic groups. Therefore, the binder imparts water repellency to a filter medium obtained. When the water repellency imparted by the binder is sufficient, as a treating agent of the filter medium, it is no need to use a water repellent material which tends to generate gaseous organic substances.

To manufacture a polymer dispersion, in which a copolymer of hydrophilic and hydrophobic monomers is dispersed in water, there are two methods. The first one is to first obtain a polymer by bulk polymerization or solution polymerization in the form of a solid matter and then disperse this polymer in water. The second one is to use a hydrophilic monomer as a dispersant and at the same time to use water as a dispersion medium to cause suspension polymerization as to take place to directly obtain polymer dispersion. In the direct method to obtain a polymer dispersion, the hydrophilic monomer is first dissolved in water, the hydrophobic monomer is added to this water solution and dispersed by stirring, and a polymerization initiator is added to form a copolymer.

In a filter medium for an air filter according to the present invention, the above-mentioned copolymer that constitutes a binder is preferable to be polymerized using organic peroxide as a polymerization initiator. Then, a binder used for a filter medium for an air filter according to the present invention can be made one that does not contain ammonium persulfate or potassium persulfate. Therefore, the filter medium for an air filter according to the present invention can much more decrease the released amount of inorganic substances that cause trouble in the manufacture of semiconductor devices than the conventional filter medium for an air filter formed using a binder containing the above-mentioned inorganic substances.

In other words, according to a filter medium for an air filter according to the present invention, the concentration of ammonium ion, chlorine ion, sulfuric acid ion generated from the binder can be reduced to 300 $\mu$g or less per gram of polymer solid content in a polymer dispersion that constitutes the binder (this value was by an analytical method to the described referring to embodiments).

In the method of producing a polymer dispersion that starts with production of a polymer by bulk polymerization or solution polymerization, a hydrophobic organic peroxide is preferably used as the polymerization initiator.

The hydrophobic organic peroxides include ketone peroxides, such as methyl ethyl ketone peroxide and cyclohexanone peroxide, dialkyl peroxides, such as di-t-butyl peroxide, t-butyl α-Cumyl peroxide and di-α-Cumyl peroxide, diacyl peroxides, such as di-isobutyl peroxide, dilauroyl peroxide and dibenzoyl peroxide, peroxy ketals, such as 2,2-bis(t-butyl peroxy) butane, alkyl peresters, such as t-butyl peroxy acetate and t-butyl peroxy pivalate, and peroxy carbonates, such as bis(2-ethylhexyl) peroxy dicarbonate and bis (2-ethoxy ethyl) peroxy dicarbonate.

Hydrophobic organic peroxides mentioned above have been most often diluted by a phthalate ester plasticizer. In that case, it is desirable to use a plasticizer of a molecular weight 400 or more. Then, gaseous organic substances generated from a filter medium are reduced.

In the method of producing a polymer dispersion that directly obtains a polymer dispersion by suspension polymerization, it is desirable to use a hydrophilic organic peroxide as the polymerization initiator. The hydrophilic organic peroxides include hydroperoxides, such as t-butyl hydroperoxide, cumen hydroperoxide, 2, 5-dimethylhexan-2, 5-dihydro peroxide, and succinic acid peroxide.

Note that the added amount of polymerization initiator to all monomers varies with different kinds of polymerization initiators, but this added amount is set from 0.5% up to 10%, for example.

With regard to the method of manufacturing a polymer dispersion, a method of directly obtaining a polymer dispersion by suspension polymerization is more preferable in terms of production cost because this method does not require a process of mechanically dispersing a polymer in water. However, in this method, the hydrophobic monomer and the polymerization initiator remain in the polymer dispersion obtained. Therefore, when the polymer dispersion obtained by this method is used, it is desirable to remove volatile organic substances contained in the polymer dispersion.

To remove volatile organic substances from the polymer dispersion, vacuum suction, aeration, nitrogen purging, or steam distillation, may be used.

In the case of vacuum suction, a polymer dispersion is put into a vessel, which is connected to a vacuum pump at normal temperature to vaporize and remove volatile organic substances out of the residue, such as the hydrophobic monomer and the polymerization initiator. According to this method, by suction under a pressure of several tens of Torr for several hours, for example, almost all organic substances of low molecular weight that become gaseous in the environment of an ordinary clean room can be removed.

Aeration is a method of injecting air into a polymer dispersion and forcibly evacuating the air that has passed through the polymer dispersion to entrain volatile organic substances along with the air to the outside. Nitrogen purging is a method of injecting a nitrogen gas, instead of air, into the polymer dispersion and forcibly evacuating the gas that has passed through the polymer dispersion to entrain volatile organic substances along with the nitrogen gas to the outside. In either of the two methods, most of organic substances of low molecular weight that become gaseous in the environment of an ordinary clean room are removed by operation for several hours.

Steam injection is a method of injecting steam into a polymer dispersion and entraining volatile organic substances along with the steam. This method can be used when the copolymer in the polymer dispersion has good heat stability. By this method, too, almost all of organic substances of low molecular weight that become gaseous in the environment of an ordinary clean room can be removed by operation for several hours.

If the adopted method of manufacturing a polymer dispersion is a method of obtaining a polymer in the form of a solid matter by bulk polymerization or solution polymerization and dispersing the polymer in water, volatile organic substances are preferably removed before the polymer is dispersed in water. However, the volatile organic substances may be removed by the above-mentioned method after the polymer has been dispersed is water.

By the above mentioned operation of removing volatile organic substances as mentioned above, the content of volatile organic substances is reduced to 1000 $\mu$g or less or preferably 500 $\mu$g or less per gram of a polymer solid content contained in a polymer dispersion that constitutes a binder.

To form a filter medium, a well-known method can be adopted. Fibers used for this purpose may be glass fiber made from glass formed by adding sodium, potassium, calcium, boron or phosphorus to silica, low-boron glass fiber, quartz fiber, silica fiber, and organic fibers made from a polyester resin or a fluorocarbon resin (polytetrafluoroethylene, for example). The binder content of a fiber is preferably from 3 wt % to 7 wt % of glass fiber in dry state, for example.

The present invention provides an air filter made by using the above-mentioned filter medium for an air filter according to the present invention and a frame and a sealing material that do not generate gaseous organic substances and assembled in a space free of gaseous organic substances. According to an air filter according to the present invention, the released amount of organic and inorganic substances that cause trouble in the manufacture of semiconductor devices can be made smaller than with a prior-art air filter.

An example of a frame that does not generate gaseous organic substances is a frame made of aluminum: As a sealing material that does not generate gaseous organic substances, there is one which includes a molecular weight of 400 or more of carboxylic acid esters as a plasticizer and a molecular weight of 300 or more of phenol compounds as an antioxidant (Refer to WO97/04851).

The "the space free of gaseous organic substances" in the present invention means "a space in which the existing, gaseous organic substances in gas is small enough to be ignored." For example, this space indicates "a space in which the amount of organic substances adsorbed on a sheet made of a specified filter medium when the sheet is left to stand for a specified period of time (presumed working hours) is 10 $\mu$g or less calculated in terms of n-hexadecane per gram of the sheet as measured by an analytical method (DHS-GC/MS) shown in the description of an embodied example." For a filter medium constituting the sheet, a filter medium made of a glass fiber used in an ULPA filter is used. For example, the filter medium of A4 size is arranged in that space by hanging from the ceiling or placed on a desk.

The "space free of gaseous organic substances" can be obtained, for example, as described in the following.

As an interior finish material (paint spread on walls and floor, wall paper, long floor sheet glued to the floor surface, dry sealing material, wet sealing material, etc.) of a building in which the space is formed, a material that does not generate gaseous organic substances is used. In addition, an organic-substance-removable filter (an activated carbon filter or the like) is installed at an air intake to the space, so that only air cleared of organic substances by the filter is introduced into the space.

For the paint coated on the walls and the floor, a polyurethane resin, a polyurea resin, and a polyurethane urea resin are used as main ingredients. For the curing agent, polyol or an amine compound is used, and a mixture made by mixing isocyanate as the main material with the curing agent is laid on the walls and the floor.

The wall paper and long floor sheet spread on the floor is made of polyvinyl chloride plastic, in which the main ingredient of the plasticizer contained is at least one of a carboxylic acid ester plasticizer, a polyester plasticizer and an epoxy compound plasticizer with a molecular weight of 400 or more, the main ingredient of the antioxidant contained is a phenol compound with a molecular weight of 300 or more and the main ingredient of the antistatic agent contained is either an alkylamine ethylene oxide addition product or an alkylamine ethylene oxide addition product with a molecular weight of 350 or more.

The dry sealing material (a mixture of raw rubber and compounding agents, formed into a specified shape) contains a lubricant, as one compounding agent, the main ingredient of which is at least either aliphatic hydrocarbon whose carbon number is 20 or more or higher alcohol whose carbon number is 18 or more. The dry sealing material also contains a plasticizer the main ingredient of which is at least one of a carboxylic acid ester plasticizer, a polyester plasticizer and an epoxy plasticizer with a molecular weight of 400 or more. The dry sealing material contains an antioxidant having as its main ingredient a phenol antioxidant with a molecular weight of 300 or more (Refer to U.S. Pat. No. 5,869,560).

The wet sealing material (filled in the gap between members and then cured) is chiefly composed of polyurethane prepolymer, and contains as one compounding agent a lubricant having as its main ingredient at least either alphatic hydrocarbon of carbon number of 20 or more or higher alcohol of carbon number of 18 or more. The wet sealing material contains a plasticizer having as its main ingredient at least one of carboxylic acid ester plasticizer, a polyester plasticizer and an epoxy plasticizer with a molecular weight of 400 or more. The wet sealing material contains an antioxidant having as its main ingredient a phenol antioxidant with a molecular weight of 300 or more.

Note here that "the main ingredient of an additive such as a plasticizer" means "an ingredient occupying 90% or more of one additive. A mixture containing additives at ratios of less than 10% each, which additives have not been mentioned as the main ingredient, may be used. An interior material formed of additives made up of such mixtures does not practically generate gaseous organic substances or even if it generates a little, the generated amount is very little and does not pose any problem.

By purifying air in a specified space with a chemical filter for adsorbing organic substances, it is possible to obtain "a space free of gaseous organic substances."

According to a clean room or local clean equipment where an air filter according to the present invention is installed, the amount of organic and inorganic substances that are present and cause trouble in the manufacture of semiconductor devices can be made smaller than in the conventional clean room or local clean equipment. Consequently, in such a clean room or local clean equipment, problems do not occur such as adsorption of organic substances to a wafer or semiconductor contamination by inorganic substance ion.

What is called local clean equipment is equipment made as an enclosed partition of a room, which is arranged such that a clean air is introduced into the enclosed space. This equipment is provided with an air filter. Examples of such clean equipment are a clean bench, clean booth, wafer stocker, wafer transfer space (clean tunnel), semiconductor fabrication equipment, and so on.

According to the present invention, there is further provided local clean equipment having a chemical filter for trapping organic substances and/or inorganic substances and an air filter for trapping suspended particulate substances in the air, the air filter being installed downstream of the chemical filter, wherein the air filter uses a filter medium for an air filter according to the present invention mentioned above, and a frame and a sealing material that do not generates gaseous organic substances, and wherein the air filter is assembled in a space free of gaseous organic substances.

Local clean equipment incorporating both a chemical filter and an air filter is ordinarily installed in clean rooms where there are lots of chemical contaminants. However, even when a chemical filter collects organic substances and/or inorganic substances, if an air filter that generates organic substances and/or inorganic substances is used, it follows that organic substances and inorganic substances from the said filter that cause trouble in the manufacture of semiconductor devices are bound to exist is the local clean equipment.

In contrast, according to local clean equipment according to the present invention, for the air filter installed downstream of the chemical filter, an air filter is used that does not generate substantially any organic and inorganic substances that cause trouble in the manufacture of semiconductor devices, and therefore it is possible to create an interior space in the local clean equipment substantially free of organic substances and inorganic substances that cause trouble in the manufacture of semiconductor devices.

Among chemical filters, there are one type that uses an adsorbent, such as particulate activated carbon, fibrous activated carbon, alumina or silica to collect organic substances, another type that uses particles coated with acid compounds or ion exchange fiber to collect ammonia or metallic elements, and yet another type that uses particles coated with alkali compounds or ion exchange fiber to collect nitrogen oxides, sulfur oxides, halogen compounds. From among those types, a suitable chemical filter is selected according to the kinds of chemical contaminants that exist in the clean room where local clean equipment is installed.

BRIEF DESCRIPTION OF THE DRAWINGS

FIG. 3 is a total ion chromatogram when an air filter No. 4 corresponding to a comparative example of the present invention was used for the clean booth in FIG. 1. This graph shows organic substances adsorbed on a wafer (wafer 10) placed downstream of the air filter.

FIG. 4 is a total ion chromatogram when an air filter available on the market corresponding to the comparative example of the present invention was used for the clean booth in FIG. 1. This graph shows organic substances adsorbed on a wafer (wafer 10) placed downstream of the air filter.

BEST MODE FOR CARRYING OUT THE INVENTION

Figure 1:
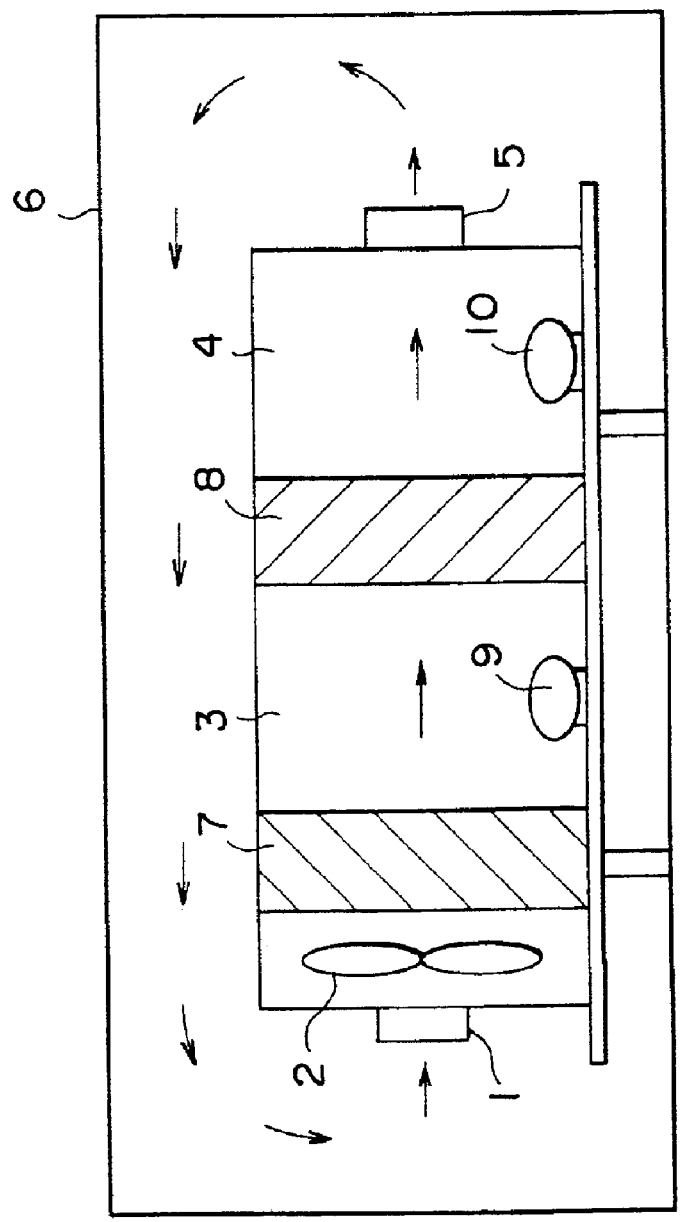
FIG. 1 is a schematic block diagram showing a clean booth for experiment, arranged to evaluate the performance of an air filter according to an embodied example of the present invention.

Description will be made of an embodiment of the present invention.

Manufacture of a Binder:

Binder No: 1

Methallyl sulfonate as a hydrophilic monomer and a mixture of methyl methacrylate and methyl acrylate as a hydrophobic monomer (methyl methadrylate:methyl acrylate=90:10) were prepared. As the polymerization initiator, a 5wt % solution of succinic acid peroxide was prepared. The percentage by weight between the hydrophilic monomer and the hydrophobic monomer was 7:93. The addition percent of the polymerization initiator to all monomers was 5 wt %.

The hydrophilic monomer and a specified amount of water were put in a reaction vessel, and stirred to dissolve the hydrophilic monomer in water. The hydrophilic monomer solution was added with a hydrophobic monomer and mixed by stirring so that the hydrophobic monomer is dispersed. The solution was added with a polymerization initiator, heated to 80° C. at normal pressure to carry out reaction for four hours to produce a polymer. While stirring the polymer dispersion obtained in the reaction vessel, steam at 100° C. was injected into the polymer dispersion for 30 minutes, volatile organic substances contained in polymer dispersion such as unreacted hydrophobic monomers, are removed from the polymer dispersion. The polymer dispersion thus made free of volatile organic substances was designated as the binder No. 1.

Binder No. 2

Methacrylate as a hydrophilic monomer and ethylene as a hydrophobic monomer were prepared. As the polymerization initiator, a solution of t-butyl peroxy pivalate dissolved in hydrocarbon to a concentration of 20 wt % was prepared. The percentage by weight between the hydrophilic monomer and the, hydrophobic monomer was 15:85, and the addition ratio of the polymerization initiator to all monomers was 5 wt %.

A polymer was first obtained as a solid matter by bulk polymerization. More specifically, methacrylate, ethylene and t-butyl peroxy pivalate were put into an autoclave, reaction was carried out for ten hours under condition of pressure at 900 atm and temperature at 150° C. to accomplish polymerization. After reaction was completed, the pressure of the vessel was reduced to remove unreacted monomers and the solvent, and thus a bulk copolymer was obtained. The bulk copolymer thus obtained was pulverized to particle sizes of 50 to 200, $\mu$m. After this, the pulverized copolymer was dispersed is water so that the polymer concentration was 20 wt % and a polymer dispersion was obtained. This polymer dispersion was designated as the binder No. 2.

Binder No. 3

Methacrylate as a hydrophilic monomer and a mixture of styrene and butyl methacrylate as hydrophobic monomers (styrene:butyl methacrylate=80:20) were prepared. As the polymerization initiator, a solution of t-butyl peroxy octoate dissolved in hydrocarbon to a concentration of 20 wt % was prepared. The percentage by weight between the hydrophilic monomer and the hydrophobic monomer was 20:80. The addition ratio of the polymerization initiator to all monomers was set at 7 wt %.

A polymer was first obtained as a solid matter by solution polymerization. More specifically, a hydrophobic monomer and a specified amount of xylene were put into the reaction vessel, and the hydrophobic monomer was dissolved in xylene by mixing. This solution was added with a hydrophilic monomer and mixed by stirring, then the polymerization initiator was added, heated to 80° C., reaction was made to take place for seven hours to accomplish polymerization. After the reaction was completed, the pressure of the vessel was reduced to remove unreacted monomers and the solvent, and a solid copolymer was obtained.

The thus produced solid copolymer was pulverized to particles sizes of 50 to 200 $\mu$m. Thereafter, the pulverized copolymer was dispersed in water so that the polymer concentration was 20 wt % and thus a polymer dispersion was obtained. This polymer dispersion was designated as the binder No. 3.

Binder No. 4

A mixture of methyl methacrylate and methyl acrylate (methyl methacrylate : methyl acrylate=80:20), which are hydrophobic monomers, was used. As an emulsifier, polyoxy alkyl phenyl ether sulfate was used and as a polymerization initiator, ammonium persulfate was used to cause emulsion polymerization to occur. The addition ratio of the polymerization initiator to all monomers was 5 wt %.

Water and the emulsifier are put in a reaction vessel, and stirred to dissolve the emulsifier in water. The solution was added with the monomers and the polymerization initiator and heated to 80% at normal pressure while it was stirred, and the monomers were polymerized by reaction for four hours. A polymer dispersion thus obtained (an acrylic emulsion) was designated as the binder No. 4.

Binder No. 5

Methyl methacrylate as a hydrophilic monomer and ethylene as a hydrophobic monomer were prepared. As the polymerization initiator, a 40 wt % solution of t-butyl peroxy octoate in dioctyl phthalate as a plasticizer was prepared. As a emulsifier, polyoxy ethylene alkyl phenyl ether was prepared. The percentage by weight of monomers was hydrophilic monomer hydrophobic monomer=15:85. The addition ratio of the polymerization initiator to all monomers was 5 wt %.

A bulk polymer was obtained as a solid matter. More specifically, methacrylate, ethylene and t-butyl peroxy octoate were put into an autoclave and the mixture was polymerized by reaction for ten hours at a temperature of 150° C. at a pressure of 900 atm. The pressure of the reaction vessel was reduced to remove unreacted monomers and the solvent, so that a bulk copolymer was obtained. The bulk copolymer thus obtained was pulverized to particle sizes of 50 to 200 $\mu$m. Subsequently, the pulverized copolymer and a emulsifier were put into a specified amount, of water and mixed by stirring, and a polymer dispersion (acrylic emulsion) of a polymer concentration of 20 wt % was obtained. This polymer dispersion was designated as the binder No. 5.

Binder No. 6

An acrylic emulsion available on the market (SX-02 by Asahi Chemical industry) was designated as the binder No. 6.

[Manufacture of Filter Medium for Air Filters]

Among fibers for the filter medium, glass fiber for commercial ULPA filters was used for the filter medium No. 1, No. 2, No. 4, No. 5 and No. 6. According to analysis of 400 mg of this glass fiber by the P&T-GC/MS method, which will be described later, siloxanes with the number of silicon atoms contained in this glass fiber or less was found to be less than the limit value of detection. This glass fiber was designated as glass fiber A.

Low-boron glass fiber was used for the filter medium No. 3. This glass fiber was designated as glass fiber B.

These kinds of glass fiber and the binders No. 1 to No. 6 were used in combination as shown in Table 1, and filter medium for air filters were manufactured by the method shown in the following. Note that the binders No. 1 to No. 3 meet the arrangement of the present invention and therefore the filter medium No. 1 to No. 3 formed by those binders correspond to the embodiment of the present invention, and the filter medium No. 4 to No. 6 correspond to a comparative example of the present invention.

Glass fiber was first dispersed in water, and this slurry was added with a binder and stirred to produce a mixture in which the fiber has been dispersed uniformly. The ratio of glass fiber to water, in which the glass fiber is dispersed, is 1 liter of water to 20 g of glass fiber. The compounding ratio by weight of the water binder and the glass fiber is 10:1. The binder addition is to be 4% to 6% by weight to the total weight of the filter medium completed.

Then, this slurry mixture was supplied and spread over the screen of a wire type paper machine, and a specified operation was performed to form non-woven fabric.

Subsequently, this non-woven fabric was heated at 120° C. for 30 minutes to remove water content from this non-woven fabric. Thus, a dry filter medium of non-woven fabric was obtained. The slurry was supplied in such an amount that a completed filter medium is about 0.4 mm in thickness.

The amount of the binder contained in the filter medium was measured as described below. A part of the filter medium obtained was cut out and its weight was measured. This piece of the filter medium was heated for 30 minutes in an oven heated at 800° C. After the piece of the filter medium was taken out of the oven and cooled, its weight was measured again. A difference in weight before and after heating was calculated, and a percentage of this difference value to the weight before heating was calculated and taken as a binder content. The calculated binder contents are shown in Table 1, which will appear later.

The thickness of the obtained filter medium was measured. This measured thicknesses of the filter medium is shown in Table 1.

Evaluation of the Filter Medium for Air Filters:
General Amount of Gaseous Organic Substances:

With regard to the filter medium obtained, the generated amounts and the kinds of gaseous substances were examined by a method described below. This method is generally called "DHS (Dynamic Bead Space)—GC/MS (Gas Chromatograph/Mass Spectrometer Method" or "P&T (Purge & Trap)—GC/MS Method."

A piece several tens of mg in weight was cut out as a sample from the filter medium and put into a test tube. While supplying a helium gas into the test tube, the test tube was heated at 150° C. for 30 minutes, and volatile ingredients (gaseous organic substances generated) were captured in a trap tube cooled to −130° C. After completion of heating for 30 minutes, the ingredients in the trap tube were made gaseous by quickly heating the tube to 300° C. for 1 minute in a current of helium gas, and the gaseous substances were introduced into a GC/MS system for analysis.

As the GC system, Hewlett Packard's HP-5890A was used. The MS system was a HP-5970B made by Hewlett Packard. The column of the GC system was a HP-Ultra 2(OV-5 Series) by the same manufacturer. The column is 0.2 mm in inside diameter, 25 mm in length and the film thickness is 0.33 $\mu$m. The temperature condition in measurement by the GC system is as follows.

The initial temperature was 40° C., and the temperature was raised at a rate of 10° C./min to the final temperature of 300° C. (held for 15 minutes). The carrier gas of the GC system was helium, the injection method is a split type and the split ratio was 1/200. The ionization method of the MS system was electron bombardment, and the detection range was from 25 to 900 in m/z.

A mass spectrum obtained shows peaks according to organic substances contained, so that the kinds of organic substances could be identified from the position of peaks. Quantitative analysis was conducted by using analytical craves of the organic substances identified at respective peaks. When there are many peaks, n-hexadecane is used as a standard substance, and the contents of ingredients are obtained as relative values with reference to the analytical curve of n-hexadecane as 1.

By dividing a total of contents of all ingredients calculated in terms of n-hexadecane by the weight off the sampled piece of a filter medium, the generated amounts in $\mu$g of organic substances per gram of the sample were calculated ($\mu$g/g).

The values of the generated amounts are also shown in Table 1.

Extracted Amounts of Inorganic Substances:

After a piece several grams in weight cut out from a filter medium was dipped for one week in a specified amount (normally 100 milliliters) of ultrapure extractive water (resistivity 18.6M$\Omega$ or more), this ultrapure water was put into an ICP (induction coupled plasma)/MS system (HP-4500 model by Hewlett Packard), and the inorganic substances that leached out to this ultrapure water were analyzed to clarify their kinds and amounts. By this method, the inorganic substances that eluted in the ultrapure water were measured down to as small as a unit as one $\mu$g, and the eluted amounts per gram of a sample of filter medium were calculated. The kinds and amounts of ion that dissolved in the ultrapure water were analyzed by the ion chromatography (ICG). The values obtained by this analysis are also shown in Table 1.

Incidentally, it has been clarified by this method that there is correlation between the kinds and the amounts of inorganic substances that eluted in ultrapure water from the same solid piece and the kinds and the amounts of inorganic substances that were released to the air from a solid piece of the filter medium left to stand in an ordinary clean room. This finding is described in Proceedings of the $42^{nd}$ Japan Society of Applied Physics and Related Societies, No. 2, p.356, 1995.

As is clear from Table 1, in the filter medium No. 1 to No. 3 corresponding to the embodiment of the present invention, the generated amount of gaseous organic substances was 20 $\mu$g or less per gram of a sample of the filter medium, and neither siloxanes nor phthalate esters were detected. The eluted amounts of inorganic substances were so small. More specifically, the eluted amount was 160 $\mu$g or less for each of Na, Ca, B and P per gram of a sample of the filter medium No. 1 or No. 2. Moreover, the eluted amount was 75 ppm or less for each of ammonium ion, chlorine ion and sulfuric acid ion. In the filter medium No. 3 using low-boron glass fiber, the eluted amount of B was very small, but the eluted amount of Na or Ca was relatively large.

In contrast, with the filter medium No. 4 to No. 6 corresponding to the comparative example of the present invention, the generated amount of gaseous organic substances is so high as 200 g per gram of a sample of the filter medium, and phthalate esters were detected. The eluted amounts of inorganic substances were high particularly with the filter medium No. 4 and No. 6. The eluted amount of ammonium ion or sulfuric acid ion from a sample of the filter medium No. 4 was particularly large, more specifically, ten times or more that of the filter medium No. 1.

Evaluation of the Clean Room:

Air filters were made from filter medium No. 1 to No. 6. Each air filter of the fan filter type was installed in the clean room, and the air in the clean room was analyzed.

(Manufacture of the Air Filter)

As a setup space for the air filter, a room A was prepared in which the wall paper, floor sheet and wet type sealing material listed below were used to finish the interior of the room, and an organic-substance-removing filter (activated carbon filter) was installed at the air intake of the room A by sealing with a dry type sealing material mentioned below. Therefore, only air made free of organic substances by the filter is introduced into the room A.

Wall Paper:
   Chief ingredient: Polyvinyl chloride resin
   Plasticizer: Ditridecyl phthalate
   Antioxidant: Steryl-$\beta$-(3, 5-di-t-butyl-4-hydroxy phenyl) propionate
   Antistatic agent: Glycerin fatty ester (Molecular weight 450 or more)

Floor Sheet:
  Chief ingredient: Polyvinyl chloride resin
  Plasticizer: Di2-ethylhexyl sebacate
  Antioxidant: Tetrakis (Methylene-3-(3', 5'-di-t-butyl-4'-hydroxyphenyl) propionate) methane
  Antistatic agent: Glycerin fatty ester (Molecular weight 450 or more)
Wet Type Sealing Material:
  Chief ingredient: Polyurethane prepolymer
  Lubricant: Not added
  Plasticizer: Di2-ethylhexyl sebacate
  Antioxidant: 2, 2'-methylene-bis-(4-methyl-6-t-butylphenol)
  Antistatic agent: Not added
Dry Type Sealing Material:
  Raw rubber: Ethylene propylene copolymer rubber
  Lubricant: Aliphatic hydrocarbon whose carbon member is 24 to 30
  Plasticizer: Not added
  Antioxidant: 2, 2'-methylene-bis-(4-methyl-6-t-butylphenol)
  Antistatic agent: Zinc oxide Note that the above-mentioned filter medium No. 1 to No. 6 were assembled in a room that has the same environment as the room A, and that was additionally fitted with a dust-removing air filter (which does not generate gaseous organic substances).

For the sealing material, a material having as its major ingredient polyurethane prepolymer including isocyanate groups, in other words, a type that cures by exposure to moisture in the air was prepared. The sealing material contains ditridecyl phthalate as a plasticizer, 2,2'-methylene-bis-(4-methyl-6-t-butylphenol)as an antioxidant, but does not contain any lubricant.

In addition, a frame made of stainless steel was prepared.

Then, the above-mentioned component materials of an air filter were brought into the room A, and the air filter was assembled in the room A.

(Measurement of air-filter dust collection efficiency)

With the assembled air filters No. 1 to No. 6 (Air filter Nos. correspond to filter medium Nos.), the dust-collection efficiency was measured as follows.

"Aerosil 200" made by Nippon Aerosil Co. was dispersed in pure water to prepare a liquid dispersion of silica particles. The Aerosil 200 is anhydrous silica obtained by thermal decomposition of silicon tetrachloride by combustion in gas phase, and without using sodium silicate as the starting material. Therefore, the Aerosil 200 does not contain sodium compounds. This liquid dispersion was put into a Ruskin nozzle type generator, and placed in the room A, in which the above-mentioned assembly work had been done, to generate silica aerosol from the generator. The dust collection efficiency was measured on each air filter by using this silica aerosol, and the dust collection efficiency was 99.99954 or more.

Assembling the Fan Filter Unit:

Fan filter units were assembled by using the air filters No. 1 to No. 6, on which the dust collection efficiency had been measured, and also a commercial air filter ("Sofiltra 340 Series by Nitta).

Besides those of the air filters, the following components of each fan filter unit (components made of materials that do not generate gaseous organic substances) were prepared.
Rotary Vanes of the Fan: Stainless Steel
Power Supply Wire of the Fan
  Chief ingredient: Polyvinyl chloride resin
  Plasticizer: Polyester plasticizer (molecular weight 400 or more) and epoxy soybean oil (Molecular weight 400 or more) Antioxidant: Steryl-β-(3, 5-di-t-butyl-4-hydroxyphenyl) propionate
  Antistatic Agent: Not added The above-mentioned components of the fan filter unit were brought into the room A, and a fan filter unit was assembled. The air filter face of the fan filter unit measures 610 mm×1200 mm.

Forming the Clean Room:

Eight fan filter units assembled as described were prepared for each air filter. Those fan filter units of the same air filter are mounted on the ceiling of the clean room.

To mount the fan filter unit on the ceiling, the dry type sealing material described below was used. The walls of the clean room were set up by putting together metal partition having baking-finished surfaces and by sealing with a wet type sealing material described below. The floor of the clean room was finished by gluing stainless sheet to the surface of the die-cast aluminum material. The generated amount of gaseous organic substances from the wall material and the floor material was 1.0 μm or less per gram of samples by the above-mentioned analytical method (P&G-GC/MS).

Dry Type Sealing Material:
  Raw rubber: Ethylene propylene copolymer rubber
  Lubricant: Aliphatic hydrocarbon of carbon number of 24–30
  Plasticizer: Not Added
  Antioxidant: 2, 2 '-methylene-bis-(4-methyl-6-t-butylphenol)
  Antistatic agent: Zinc oxide
Wet Type Sealing Material:
  Chief ingredient: Polyurethane prepolymer
  Lubricant: Not added
  Plasticizer: Di2-ethylhexyl sebacate
  Antioxidant: 2, 2 '-methylene-bis-(4-methyl-6-t-butylphenol)
  Antistatic agent: Not added Note that at the atmospheric air intake of the clean room, an outdoor air treating unit is installed, which incorporates a pre-filter, a medium efficiency air filter, and a HEPA filter.

Analysis of Air Taken in:

With regard to air (to be fed into the air filter) that has passed through this outdoor air-treating unit but has not yet gone into the fan filter unit, the contained organic and inorganic substances were analyzed in the manner described below. Analysis results are shown in Table 2 given below.

In analysis of organic substances, 40 liters of air of the clean room was introduced into the Tenax tube (a trade name of Chrompack) so that organic substances in the air were adsorbed on the internal adsorbent in the column. Thereafter, the tube was set on a TCT unit (Thermal Desorption Cold Trap Injector), and the organic substances adsorbed in the Tenax column were desorbed by the TCT unit and were heated and introduced into the CC/MS unit. By this method, the organic substances adsorbed in the Tenax column were measured in μg unit, and the content of organic substances per 1m$^3$ of air in the clean room was calculated.

In analysis of inorganic substances, air in the clean room was introduced at a flow rate of 10 liters a minute for 24 hours into an impinger containing 200 milliliters of ultrapure water (resistivity 18.6 MΩ or more) to elute the air borne inorganic substances, into ultrapure water. The ultrapure water solution was introduced into the ICP/MS unit (SP- 4500 by Hewlett Packard) for analysis. By this method, the inorganic substances eluted into ultrapure water were measured to ng unit, and the eluted amount per $lm^3$ of air in the clean room was calculated. Ion were analyzed by ion chromatography.

Analysis of Air in the Clean Room:

The clean room described above was put into operation under condition of outlet air velocity of 0.3 m/s at the fan filter unit, room temperature of 23° C. and relative humidity of 40%. The air circulation rate per hour was set at 200. After passage of seven days from the start of operation, analysis of organic and inorganic substances contained in the air in the clean room was carried out by the same method as is the above-mentioned analysis of air taken in. Analysis results are shown in Table 2 given below.

After the elapse of seven days from the start of operation, cleaned silicon wafers of 6 inches in diameter were left to stand for 13 hours in the clean room and the amounts and the kinds of organic substances adsorbed on the wafers were analyzed by a SWA unit.

To clean wafers, a method was adopted which carries out oxidizing decomposition of organic substances on the wafer surface by ozone gas under ultraviolet ray irradiation. With a wafer cleaned by this method, the surface is covered with an oxide film, with the result that this wafer is more likely to adsorb organic substances than a wafer cleaned by fluoric acid. More specifically, the adsorption speed is about 6 times higher for a wafer cleaned by this method under the same environment. Therefore, when the organic substance concentration in the air is low, it is preferable to use a wafer cleaned with this method as a wafer to adsorb organic substances.

The SWA unit mentioned above is a silicon wafer analyzer (trade name) by GL Science Inc., and this instrument consists of a desorption unit with a trap, a TCT (Thermal Desorption Cold Trap injector) unit, and a GC/MS unit as described below. By the desorption unit, the adsorbates on silicon wafer are thermally desorbed therefrom and then the desorbates are collected in the trap. After the substances collected by the trap unit are heated to 300° C. in a current of helium, the TCT unit guides the substances into a capillary tube cooled to −130° C. by liquid nitrogen, and thereby cooled and trapped. The substances trapped by this TCT unit are quickly heated to 300° C. in a current of helium and then introduced into the GC/MS unit.

The GC unit is a SP-5890A by Hewlett Packard and, the MS unit is a SP-5971A by the same manufacturer. The column of the GC unit is a SP-5 by the same manufacturer (crosslinked 5% phenyl methyl silicone). The column is 0.2 mm in inside diameter, 25 mm in length and 0.33 $\mu$m in film thickness. The temperature condition for measurement by the GC unit was as follows.

The initial temperature was 80° C. (held for 10 minutes, and the temperature was raised at a rate of 7° C./min to the final temperature of 300° C. (held for 10 minutes).

The other condition were the same as in the P&T-GC/MS method mentioned above. Thus, the contents and the kinds of organic substances adsorbed on the sample wafer surface were measured. This method enables analysis in the order of several pg ($10^{-12}$ g). The values obtained by dividing measured contents by the area of wafer surface were calculated as adsorbed contents (pg/cm$^2$) of organic substances on sample wafers. The wafers cleaned but not exposed to the clean room were also subjected to the same analysis as blank wafers, and the adsorbed contents of organic substances on blank wafers were calculated.

"The amount of organic adsorbates" on silicon wafer is obtained by subtracting the organic adsorbates on the reference wafer of no exposure to the air from that on the sample wafer exposed to clean room air. Therefore, this difference value, "the amount of organic adsorbates" was calculated as for each clean room. The calculated values are shown in Table 2.

A difference value, which is obtained by subtracting the content of organic and inorganic substances contained in the taken-in air from the content of organic and inorganic substances in the air in the clean room, corresponds to the amount of organic and inorganic substances generated by the fan filter unit (air filter).

If the difference values are calculated from values in Table 2, the difference values are found to be small values even if the difference is a plus value or a minus value about the organic substances and the inorganic substances in the clean rooms (1)–(3) which correspond to the embodiment of the present invention. This means that the fan filter units (air filters) do not generate either organic substances or inorganic substances, or even if they generate, the generated amounts are very small.

On the contrary, in the clean rooms (4)–(7) corresponding to the comparative example of the present invention, the difference values are large plus values except for inorganic substances, such as K and Ca. in other words, the fan filter units (air filters) generate large amounts of organic and inorganic substances.

In respect to the adsorbed amounts of organic substances on the wafer, the values are much smaller in the clean rooms (1)–(3) than in the clean rooms (4)–(7).

Performance Evaluation of Air Filters in Clean Booth:

A clean booth for experiment was erected as shown in FIG. 1, and the performance of air filters was evaluated in the clean booth.

This booth comprises, as we move from the upstream side of the airflow, an air intake 1, a blower 2, a first space 3, a second space 4, and an air exhaust opening 5. The whole booth is covered with a covering sheet 6. The air escaping from the air exhaust opening 5 returns to air intake 1 and enters the air intake 1, and thus circulates. A chemical filter 7 is provided between the blower 2 and the first space 3, and an air filter 8 is provided between the first space 3 and the second space 4. For the chemical filter 7, one (Clean Sorb II, CH-C made by Kondo industry Ltd., for example) that has fibrous activated carbon to adsorb chiefly organic substances was used. For the air filter 8, the filters Nos. 1, 3 and 4 fabricated as described and an air filter available on the market that had been used in the clean room (7) were used.

Six inch diameter silicon wafers 9 and 10 with cleaned surfaces were placed in the first space 3 and the second space 4 of this booth, and the blower 2 was operated under condition of air velocity of 0.4 m/s at the air exhaust opening 5, room temperature of 23° C. and relative humidity of 40%. After the elapse of 24 hours from the start of operation of the blower 2, the wafer 9 was taken out from the first space 3 and the wafer 10 from the second space 4, the amounts and the kinds of organic substances adsorbed on the wafers were analyzed by the same analytical method as in the above-mentioned analysis of the air in the clean room.

Figure 2:
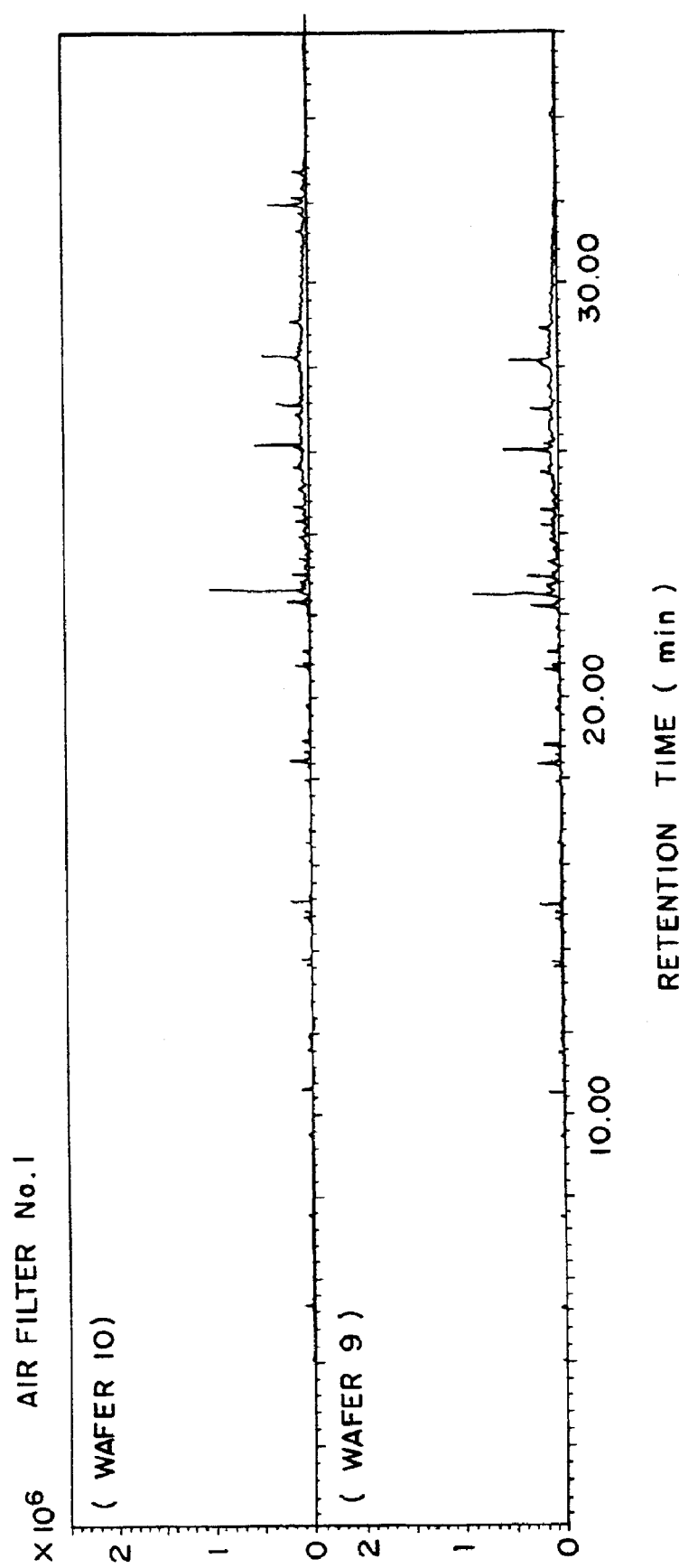
FIG. 2 shows two total ion chromatograms obtained when an air filter No. I according to the embodiment of the present invention was used for the clean booth in FIG. 1. One is a total ion chromatogram that indicates organic substances adsorbed on a wafer (wafer 10) placed downstream of the air filter, and the other is a total ion chromatogram that indicates organic substances adsorbed on a wafer (wafer 9) placed upstream of the air filter.

The performance of the air filter 8 can be compared by a difference value obtained by the organic substance content adsorbed on the wafer 9 from the organic substance content, adsorbed on the wafer 10. To this end, difference values were calculated using the total amount of adsorbed organic substances and the adsorbed amounts of different kinds of organic substances. The results are shown in Table 3. FIG. 2 shows two total ion chromatogram (TIC) when the air filter No. 1 was used. One TIC shows organic substances adsorbed on a wafer 9 and the other TIC shows organic substances adsorbed on a wafer 10. FIG. 3 is a TIC that shows organic substances adsorbed on a wafer 10 when the air filter No. 4 was used. FIG. 4 is a TIC that shows organic substances adsorbed on a wafer 10 when a commercially available air filter was used.

As is obvious from FIG. 2, the TIC on a wafer 10 hardly differs from the TIC on a wafer 9 when the air filter No. 1 was used. If one compares TICS on wafers 10 in FIGS. 2 to 4, one can see that many more kinds and greater amounts of organic substances were adsorbed on wafers 10 when the air filter No. 4 and the commercial air filter were used than when the air filter No. 1 was used. The TIC on a wafer 9 when the air filter No. 4 or the commercial air filter was used shows almost the same result as in the TIC on a wafer 9 in FIG. 2.

As is shown in Table 3, the adsorbed amount of organic substances in the second space 4 is far smaller when the air filter No. 1 or No. 3 corresponding to the embodiment of the present invention was used than when the air filter No. 4 or the commercial air filter corresponding to the comparative example of the present invention was used. When the air filter No. 1 or No. 3 corresponding to the embodiment of the present invention was used, adipic acid ester and phthalate esters are not generated by the air filter 8, and therefore are not adsorbed on the wafer 10.

Thus, in a clean booth, in which an air filter 8 according to the present invention is installed downstream of the chemical filter 7 capable of removing organic substances, the space downstream of the air filter 8 can be made substantially free of organic substances that cause trouble in the manufacture of semiconductor devices. In other words, the space located downstream of the air filter as in this clean booth can be used as a suitable place for storing wafers.

TABLE 1

| | Filter medium No. 1 | Filter medium No. 2 | Filter medium No. 3 | Filter medium No. 4 | Filter medium No. 5 | Filter medium No. 6 |
|---|---|---|---|---|---|---|
| Detail of filter medium | | | | | | |
| Kind of fiber | Glass fiber A | Glass filer A | Glass fiber B | Glass fiber A | Glass fiber A | Glass fiber A |
| Binder No. | 1 (Example) | 2 (Example) | 3 (Example) | 4 (Comp. example) | 5 (Comp. example) | 6 (Comp. example) |
| Binder content | 5.4% | 6.2% | 5.3% | 5.5% | 6.2% | 6.3% |
| Filter medium thickness | 0.39 mm | 0.38 mm | 0.38 mm | 0.40 mm | 0.40 mm | 0.39 mm |
| The amount of generated organic substances ($\mu g/g$) | 20 or less | 20 or less | 20 or less | 282 | 315 | 370 |
| Siloxanes | Undetected | Undetected | Undetected | Undetected | Undetected | Traces detected |
| Phthalate esters | Undetected | Undetected | Undetected | Traces detected | DOP, 85 | DBP, 68 |
| Other organic substances | Styrene | Undetected | Traces of hydrocarbon | 2-ethyl-1-hexanol | Undetected | Undetected |
| Eluted amount of inorganic substances | | | | | | |
| Na | 122 | 147 | 480 | 400 | 135 | 276 |
| Ca | 156 | 40 | 200 | 162 | 163 | 233 |
| B | 80 | 76 | 5 | 127 | 87 | 64 |
| P | Undetected | Undetected | Undetected | Undetected | Undetected | Undetected |
| Ammonium ion | Undetected | Undetected | Undetected | 3200 | Undetected | 273 |
| Chlorine ion | 55 | 23 | 37 | 340 | 62 | 165 |
| Sulfuric acid ion | 72 | 29 | 46 | 1280 | 83 | 360 |

Note:
The eluted amount of inorganic substances are in "$\mu g/g$".
DBP stands for dibutyl phthalate.
DOP stands for dioctyl phthalate.

TABLE 2

| Air filter No. (Filter medium No.) | (1) No. 1 | (2) No. 2 | (3) No. 3 | (4) No. 4 | (5) No. 5 | (6) No. 6 | (7) Coml. air filter |
|---|---|---|---|---|---|---|---|
| Analysis taken-in air | | | | | | | |
| Content of organic substances ($\mu g/m^3$) | 25 | 21 | 22 | 23 | 25 | 21 | 21 |
| Eluted amount of inorganic substances Na | 28 | 25 | 28 | 23 | 25 | 28 | 30 |
| K | 15 | 13 | 16 | 12 | 18 | 11 | 12 |
| Ca | 36 | 41 | 46 | 25 | 33 | 28 | 35 |
| B | 14 | 17 | 15 | 15 | 16 | 18 | 19 |
| $Cl^-$ | 35 | 40 | 43 | 47 | 36 | 55 | 48 |
| $NO_3^-$ | 253 | 222 | 287 | 283 | 304 | 291 | 263 |
| $SO_4^{2-}$ | 541 | 604 | 587 | 607 | 565 | 618 | 596 |
| $NH_4^+$ | 894 | 923 | 872 | 920 | 995 | 963 | 883 |
| Analysis of air in CR | | | | | | | |
| Content of organic substances ($\mu g/m^3$) | 23 | 22 | 18 | 38 | 45 | 73 | 80 |
| Eluted amount of inorganic substances Na | 10≦ | 10≦ | 10≦ | 35 | 42 | 36 | 36 |
| K | 10≦ | 10≦ | 10≦ | 10≦ | 10≦ | 10≦ | 10≦ |
| Ca | 10≦ | 10≦ | 10≦ | 10≦ | 10≦ | 10≦ | 10≦ |
| B | 80 | 96 | 9 | 83 | 95 | 110 | 88 |
| $Cl^-$ | 36 | 39 | 45 | 50 | 42 | 43 | 56 |
| $NO_3^-$ | 283 | 253 | 267 | 300 | 315 | 400 | 685 |
| $SO_4^{2-}$ | 186 | 206 | 213 | 1150 | 213 | 850 | 1020 |

TABLE 2-continued

| Air filter No. (Filter medium No.) | (1) No. 1 | (2) No. 2 | (3) No. 3 | (4) No. 4 | (5) No. 5 | (6) No. 6 | (7) Coml. air filter |
|---|---|---|---|---|---|---|---|
| $NH_4^+$ | 917 | 967 | 863 | 2530 | 1020 | 1240 | 1870 |
| Absorbed amount of organic substances adsorbed on wafer ($pg/cm^2$) | 105 | 128 | 146 | 2530 | 1750 | 3580 | 2230 |
| Siloxanes | 0 | 0 | 0 | 0 | 0 | 220 | 105 |
| Phthalate esters | 0 | 0 | 0 | 50 | 815 | 625 | 531 |

Note:
The eluted amount of inorganic substances are in "$ng/m^3$".

TABLE 3

| Air filter No. | No. 1 | No. 3 | No. 4 | Commercial air filter |
|---|---|---|---|---|
| Absorbed amount of organic substances | 53 | 78 | 8430 | 7510 |
| 2-ethylhexanol | 0 | 0 | 390 | 40 |
| 2,6-di-t-butyl-p-benzoquinone | 12 | 0 | 0 | 0 |
| Adipic acid ester | 0 | 0 | 0 | 127 |
| Dibutyl phthalate | 0 | 0 | 90 | 104 |
| Dioctyl phthalate | 0 | 0 | 0 | 0 |
| Other organic substances | 41 | 78 | 7950 | 7230 |

Unit: $pg/cm^2$

INDUSTRIAL APPLICABILITY

As has been described, according to the filter medium for air filter, the generated amounts of organic and inorganic substances that cause trouble in the manufacture of semiconductor devices can be reduced to a lower level than in the prior art.

According to a method for manufacturing filter medium for air filter according to the present invention, it is possible to obtain filter medium for air filter, which generates smaller amounts of organic and inorganic, which cause trouble in the manufacture of semiconductor devices, than in the conventional air filter.

According to a clean room or local clean equipment, in which an air filter according to the present invention is installed, the amounts of organic and inorganic substances that cause trouble in the manufacture of semiconductor devices can be made smaller than in the conventional clean room or local clean equipment. Above all also, according to local clean equipment where an air filter according to the present invention is installed downstream of a chemical filter, the interior of local clean equipment can be made substantially free of organic and inorganic substances that cause trouble in the manufacture of semiconductor devices.

What is claimed is:

1. A method for manufacturing a filter medium for an air filter to be used in the manufacture environment of a semiconductor device, comprising the steps of forming a non-woven fabric by binding fibers by a binder, said binder having its chief ingredient of a polymer dispersion having a copolymer of a hydrophilic monomer and a hydrophobic monomer dispersed in water, and obtaining said polymer dispersion by a polymerization step of dissolving the hydrophilic monomer in water, adding the hydrophilic monomer to this water solution and dispersing said hydrophobic monomer in said water solution, and adding a polymerization initiator to form said copolymer, wherein in said polymerization step, a hydrophilic organic peroxide of cumen hydroperoxide, 2,5-dimethylhexane-2, 5-hydroperoxide, or succinic acid peroxide is used as polymerization initiator.

2. A filter medium manufactured by the method of claim 1.

3. An air filter comprising:

a filter medium for an air filter according to claim 2; and a frame and a sealing material incapable of generating gaseous organic substances, wherein said air filter is assembled in space free of gaseous organic substances.

4. A clean room having an air filter according to claim 3 installed therein.

5. Local clean equipment comprising a chemical filter installed therein for trapping at least one of organic substances and inorganic substances and an air filter according to claim 3 installed therein for trapping suspended particulate substances in the air, said air filter being installed downstream of said chemical filter.

6. A method for manufacturing semiconductor devices wherein a silicon wafer for said semiconductor device is processed in at least one of a clean room and local clean equipment having an air filter as defined in claim 3.

7. Local clean equipment having an air filter according to claim 3 installed therein.

8. Local clean equipment as defined in claim 7 which comprises a clean bench, a clean booth, a wafer stocker, wafer transfer space, and semiconductor fabrication equipment.

* * * * *